Figure 1:
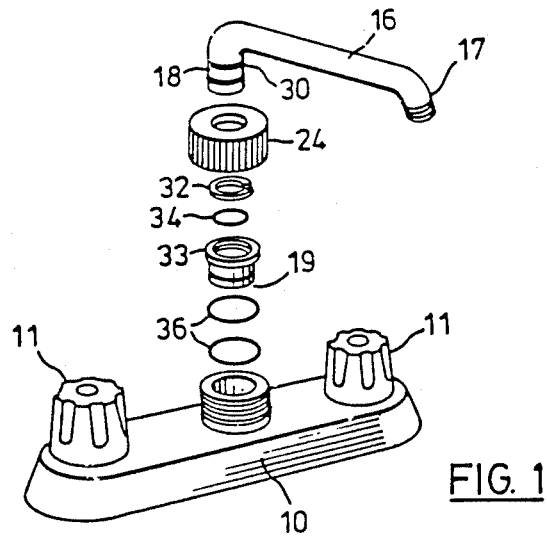

United States Patent [19]

Bondar

[11] Patent Number: 4,739,523
[45] Date of Patent: Apr. 26, 1988

[54] COMBINATION INCORPORATING REPLACEMENT FAUCET SPOUT

[76] Inventor: Jerry Bondar, 43 Lissom Crescent, Willowdale, Ontario, Canada, M2R 2P2

[21] Appl. No.: 880,947

[22] Filed: Jun. 26, 1986

Related U.S. Application Data

[63] Continuation of Ser. No. 615,099, May 29, 1984, abandoned.

[51] Int. Cl.$^4$ .............................................. F16L 25/00
[52] U.S. Cl. ........................................ 4/191; 285/177; 137/801
[58] Field of Search .................. 4/191, 192; 137/605, 137/606, 801; 206/223, 574; 285/177, 12, 354, 8

[56] References Cited

U.S. PATENT DOCUMENTS

| | | | |
|---|---|---|---|
| 179,698 | 7/1876 | Hagar | 285/386 |
| 589,362 | 8/1897 | Miles | 285/8 |
| 1,707,353 | 4/1929 | Fraser . | |
| 1,741,588 | 12/1929 | Schneider . | |
| 1,923,691 | 8/1933 | Schornstein . | |
| 1,929,536 | 10/1933 | Schulte, Jr. | 137/606 |
| 2,134,966 | 11/1938 | Boscow et al. | 137/606 |
| 2,389,599 | 11/1945 | Delany | 137/606 |
| 2,468,315 | 4/1949 | Wagner . | |
| 2,504,610 | 4/1950 | Wolf | 137/605 |
| 2,654,390 | 10/1953 | Archer et al. | 137/801 X |
| 2,702,201 | 2/1955 | Romanelli et al. | 285/8 |
| 2,781,786 | 2/1957 | Young | 137/801 |
| 3,074,246 | 1/1963 | Shames et al. | 285/8 |
| 3,127,986 | 4/1964 | Hulka | 206/223 |
| 3,169,014 | 2/1965 | Wilson et al. | 206/223 X |
| 3,338,597 | 8/1967 | Mason | 285/177 |
| 3,396,604 | 8/1968 | Samuels et al. . | |
| 3,456,305 | 7/1969 | Voit | 206/574 X |
| 3,502,355 | 3/1970 | Demler, Sr. et al. . | |
| 3,570,537 | 3/1971 | Kelly | 137/606 |
| 3,572,162 | 3/1971 | Gresham et al. . | |
| 3,582,116 | 6/1971 | Young | 403/359 |
| 3,758,920 | 9/1973 | Dobrjanskyj et al. . | |
| 3,776,373 | 12/1983 | Mullen | 206/576 |
| 3,791,402 | 2/1974 | Shuler . | |
| 3,965,528 | 6/1976 | Kissler | 16/110 R |
| 3,994,608 | 11/1976 | Swiderski et al. . | |
| 3,998,240 | 12/1976 | Liqutaud | 137/606 |
| 4,000,539 | 1/1977 | Neyer . | |
| 4,064,900 | 12/1977 | Schmitt | 137/606 |
| 4,065,216 | 12/1977 | Nelson . | |
| 4,346,735 | 8/1982 | Raz | 137/801 |
| 4,484,600 | 11/1984 | Peterson et al. | 4/192 |
| 4,589,688 | 5/1986 | Johnson | 285/12 |

FOREIGN PATENT DOCUMENTS

| | | | |
|---|---|---|---|
| 1277202 | 6/1972 | United Kingdom | 137/801 |
| 2007791 | 5/1979 | United Kingdom | 285/177 |
| 2065468 | 7/1981 | United Kingdom | 4/191 |

OTHER PUBLICATIONS

"Ermeto Reducer Coupling" from *Weatherhead Catalog*, 10-8-1948.

*Primary Examiner*—Henry J. Recla
*Assistant Examiner*—L. J. Peters

[57] ABSTRACT

In a combination incorporating a replacement faucet spout there is included a series of bushings, and a series of spout nuts through each of which a base end portion of the replacement spout may be disposed. The cylindrical bores in the bushings are substantially identical and are each of a diameter such that the base end portion of the spout is swivellably mountable therein, the outer cylindrical surface of each bushing being of different diameter than that of each remaining bushing, and the internally screw-threaded bore in each spout nut being of different diameter than that of each remaining nut, whereby a selected one of the bushings, the diameter of the outer cylindrical surface of which is complementary to that of the inner bore in a boss, is adapted to be disposed in the inner bore in the boss, with the base end portion of the spout swivellably mounted within the inner bore in said selected one of the bushings, and a selected one of the spout nuts, the diameter of the screw-threaded bore in which is complementary to that of the external screw-threading of the boss, is adapted to be screw-threadedly secured to said external screw-threading of the boss, with the base end portion of the spout, said selected one of the bushings, and said selected one of the spout nuts being restrained against substantial relative axial movement therebetween.

5 Claims, 1 Drawing Sheet

U.S. Patent

Apr. 26, 1988

4,739,523

COMBINATION INCORPORATING REPLACEMENT FAUCET SPOUT

This application is a continuation of application Ser. No. 06/615,099, filed May 29, 1984, now abandoned.

This invention is concerned with a combination of parts for replacement of a faucet spout in an existing faucet installation. In many faucet installations such as those associated with twin-tub kitchen sinks it is conventional to provide a faucet spout comprising a water discharge end portion and a base end portion which is swivellably mounted within an externally screw-threaded boss the bore of which is in communication with the water piping, so that by operation of the water control valve or valves the water may, as desired, be permitted to flow through the bore of the boss and thence through the spout. A spout nut having an aperture through which the base end portion of the spout is disposed is screw-threadedly mounted on the boss to prevent withdrawal of the base end portion of the spout from the boss, while permitting said swivellable movement of the base end portion of the spout so that as desired water can be discharged from the water discharge end portion of the spout into either of the tubs of the sink.

Through use of the faucet installation over an extended period of time the spout and particularly the base end portion thereof and/or the associated spout nut may become worn, or may otherwise be damaged, thereby necessitating replacement of the spout and/or spout nut, unless of course the entire installation is replaced which is more expensive and in many cases unnecessary.

A problem in relation to the provision of a replacement faucet spout and/or spout nut is that there have been no generally accepted standards in the industry for the characteristics of the externally screw-threaded boss and which consist of the internal and external diameters thereof, and the form of the screw-threading thereof, and it is of course expensive for suppliers to maintain an inventory of replacement faucet spouts the diameters of the base end portions of which are complementary to the internal diameters of all the externally screw-threaded bosses in use, and associated spout nuts the internal diameters and form of screw-threading of which are complementary to the external diameters and form of the screw-threading of all such bosses in use.

It is accordingly a primary object of the present invention to provide a combination incorporating a replacement faucet spout in which the above-described disadvantage is substantially overcome or mitigated.

In accordance with one aspect of the present invention there is provided in combination a single replacement faucet spout having a water discharge end portion and a base end portion, a series of bushings each having an outer cylindrical surface and an inner cylindrical bore, and a series of spout nuts each having an end wall, an internally screw-threaded bore and an aperture in the end wall and through which the base end portion of the spout may be disposed. The cylindrical bores in the bushings are of substantially identical diameter which is such that the base end portion of the spout is swivellably mountable therein about an axis, the diameter of the outer surface of each bushing being different from the diameter of the outer surface of each remaining bushing. The internally screw-threaded bore in each spout nut is different from the internally screw-threaded bore in each remaining nut with respect to at least one characteristic selected from the group consisting of the diameter thereof, and the form of the screw-threading thereof, whereby a selected one of the bushings, the outer diameter of which is complementary to the diameter of an inner bore in a boss, is adapted to be disposed in the inner bore in the boss, with the base end portion of the spout swivellably mounted within the inner bore in said selected one of the bushings, and a selected one of the spout nuts, the diameter and form of the screw-threaded bore in which are complementary to the diameter and form of external screw-threading of the boss, is adapted to be screw-threadedly secured to said external screw-threading of the boss, with the base end portion of the spout, said selected one of the bushings, and said selected one of the spout nuts being restrained against substantial relative axial movement therebetween. In accordance with a further aspect of the present invention there is provided in combination a plurality of replacement faucet spouts each having a water discharge end portion and a base end portion with the base end portions of the spouts being of substantially identical external diameter, a series of bushings each having an outer cylindrical surface and an inner cylindrical bore, and a series of spout nuts each having an end wall, an internally screw-threaded bore and an aperture in the end wall and through which the base end portion of each of the spouts may be disposed. The cylindrical bores in the bushings are of substantially identical diameter which is such that the base end portion of each of the spouts is swivellably mountable therein about an axis, the diameter of the outer surface of each bushing of the series thereof being different from the diameter of the outer surface of each remaining bushing of the series thereof. The internally screw-threaded bore in each spout nut of the series thereof is different from the internally screw-threaded bore in each remaining nut of the series thereof with respect to at least one characteristic selected from the group consisting of the diameter thereof, and the form of the screw-threading thereof, whereby a selected one of the series of bushings, the outer diameter of which is complementary to the diameter of an inner bore in a boss, is adapted to be disposed in the inner bore in the boss, with the base end portion of one of the spouts swivellably mounted within the inner bore in said selected one of the series of bushings, and a selected one of the series of spout nuts, the diameter and form of the screw-threaded bore in which are complementary to the diameter and form of external screw-threading of the boss, is adapted to be screw-threadedly secured to said external screw-threading of the boss, with the base end portion of said one of the spouts, said selected one of the series of bushings, and said selected one of the series of spout nuts being restrained against substantial relative axial movement therebetween.

Figure 2:
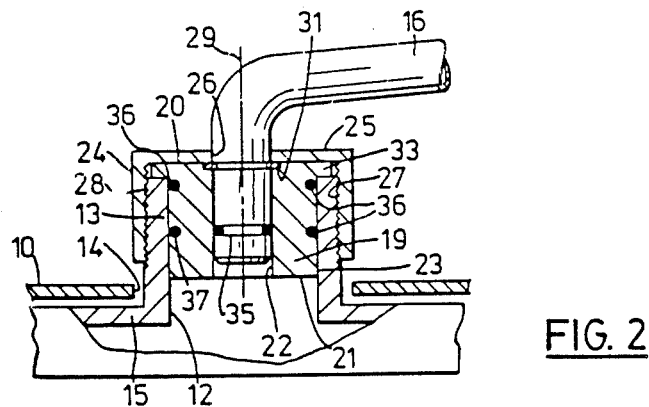
Figure 3:
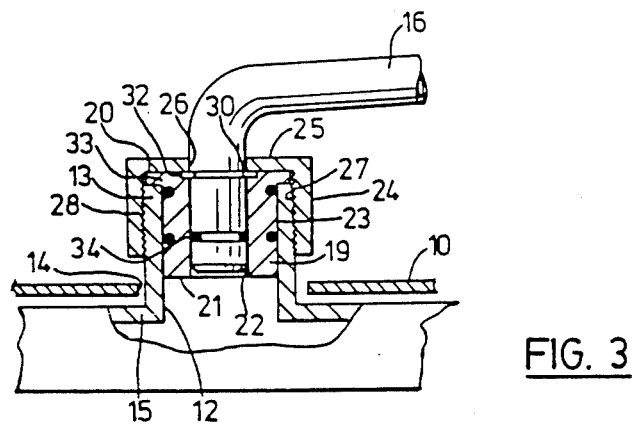

In order that the present invention may be more clearly understood and more readily carried into effect the same will now, by way of example, be more fully described with reference to the accompanying drawing in which FIG. 1 is a view of a faucet installation incorporating a replacement faucet spout of a combination according to a preferred embodiment of the invention, with parts of the combination shown in exploded form;

FIG. 2 is a partially sectioned view of the replacement faucet installation of FIG. 1 shown in its fully assembled condition; and FIG. 3 is a view corresponding to FIG. 2 but showing a faucet installation in which the diameter of the externally screw-threaded boss is different from that in FIG. 2.

Referring to the drawing, 10 denotes generally a casing on which are mounted two faucet handles 11 one of which operatively controls a faucet valve for the supply of hot water and the other of which operatively controls a faucet valve for the supply of cold water through piping to a bore 12 of an externally screw-threaded boss 13 projecting through an opening 14 in the casing 10, the portion of the water piping adjacent the boss 13 being shown in FIGS. 2 and being 3 and denoted by the reference numeral 15.

In accordance with the present invention there is provided a single replacement faucet spout 16 having a water discharge end portion 17 and a base end portion 18 which is swivellably mounted within the bore 12 of the boss 13. A combination according to the invention also comprises a series of bushings 19 two of which are shown in FIGS. 2 and 3. Each of these bushings 19 which may be of, for example, brass or moulded plastics material comprises a first or upper end 20 and a second or lower end 21, and a central cylindrical bore 22 the diameter of which is substantially identical in all the bushings 19 and is complementary to the diameter of the base end portion 18 of the spout 16 so that, as shown in FIGS. 2 and 3, this base end portion 18 of the spout 16 may be swivellably mounted within the bore 22 in any of the bushings 19.

The diameter of the outer cylindrical surface 23 of each bushing 19 is different from the diameter of the outer cylindrical surface 23 of each remaining bushing 19 of the series thereof, with the diameter of the outer surface 23 of each bushing 19 being complementary to the diameter of the inner bore 12 in a respective boss 13 which is in use so that for a boss 13 the bore 12 of which is of a particular diameter one of the bushings 19 may be selected for mounting therein.

The combination according to the invention further comprises a series of spout nuts 24 each having an end wall 25 in which is provided an aperture 26 through which the base end portion 18 of the spout 16 may be disposed, and each having an internally screw-threaded bore 27, with in each nut 24 at least one of the characteristics of the group consisting of the diameter of the screw-threading 27 and the form of this screw-threading 27 being different from such characteristic in each of the remaining nuts 24. These characteristics of each nut 24 are complementary to the corresponding characteristics of the external screw-threading 28 of a respective boss 13 which is in use, so that in order to install the replacement faucet spout 16 of the combination according to the present invention the former faucet spout, and spout nut, are removed and a selected one of the series of spout nuts 24, the diameter and form of the screw-threading 27 of which are complementary to the diameter and form of the screw-threading 28 of the boss 13 in question, is disposed with the base end portion 18 of the replacement spout 16 through the aperture 26. Thereafter a selected one of the bushings 19, the diameter of the outer cylindrical surface 23 of which is complementary to the diameter of the bore 12 in the boss 13, is disposed with the base end portion 18 of the spout 16 within the bore 22 thereof. The above-described assembly comprising the spout 16, the selected one of the nuts 24 and the selected one of the bushings 19 is then mounted with the bushing 19 within the bore 12 of the boss 13, and by rotation of the nut 24 in the appropriate direction the screw-threading 27 of the nut 24 is tightened on the screw-threading 28 of the boss 13 thereby to complete the installation of the replacement faucet spout 16, means being provided to restrain the base portion 18 of the spout 16, said selected one of the bushings 19, and said selected one of the spout nuts 24 against substantial relative movement therebetween in the direction of the axis 29 about which the base end portion 18 of the spout 16 may be swivelled. This means preferably comprises an annular spout recess 30 in the base end portion 18 of the spout 16, an annular bushing recess 31 in the bore 22 of each bushing 19 at the end 20 thereof, a circlip 32 which is adapted to be disposed partially in each of these recesses 30, 31, and an outwardly projecting flange 33 which is presented at said one end 20 of each bushing 19 and which, as shown in FIGS. 2 and 3, is tightly clamped between the end of the boss 13 and the wall 25 of the nut 24 when the replacement faucet spout 16 is installed.

In the accompanying drawing, FIG. 3 shows an installation in which the diameter of the bore 12 of the boss 13, and hence also the diameter of the outer cylindrical surface 23 of the bushing 19, is less than the diameter of the bore 12 of the boss 13, and hence also the diameter of the outer cylindrical surface 23 of the bushing 19 in the installation of FIG. 2. Furthermore, in FIG. 3 the diameter of the screw-threading 28 of the boss 13, and hence also the diameter of the screw-threading 27 of the nut 24, is less than the diameter of the screw-threading 28 of the boss 13, and hence also the diameter of the screw-threading 27 of the nut 24, in FIG. 2.

Preferably, an elastomeric ring seal 34 may be provided within an annular recess 35 formed in the base end portion 18 of the replacement spout 16, and corresponding elastomeric ring seals 36 may be disposed within spaced annular recesses 37 formed in each of the bushings 19.

While in the present invention as hereinbefore described with reference to the accompanying drawings there is a single replacement faucet spout 16 it will, of course, be appreciated that there may be provided a plurality of such replacement faucet spouts 16 with the base end portions of the spouts 16 being of substantially identical external diameter. Furthermore, in relation to each of the bushings 19 of the series thereof there may, of course, be provided one or more further bushings 19 which are identical to the bushing 19 of said series thereof, and in relation to each of the spout nuts 24 of the series thereof there may, of course, be provided one or more further spout nuts 24 which are identical to the spout nut 24 of the series thereof. In other words, there may be provided one or more further series of the bushings 19 with each bushing 19 of each series thereof being identical to one of the bushings 19 of each of the remaining series thereof, and one or more further series of the spout nuts 24 with each spout nut 24 of each series thereof being identical to one of the spout nuts 24 of each of the remaining series thereof.

There may also be provided more than one circlip 32 with the circlips 32 being identical, and there may be provided more than one of the elastomeric ring seals 34 and more than one of each of the elastomeric ring seals 36.

I claim:

1. In combination a single replacement faucet spout having a water discharge end portion and a base end portion, a series of bushings each having an outer cylindrical surface and an inner cylindrical bore, and a series of spout nuts each having an end wall, an internally screw-threaded bore and an aperture in the end wall and through which the base end portion of the spout may be disposed, the cylindrical bores in the bushings being of substantially identical diameter which is such that the base end portion of the spout is swivellably mountable therein about an axis, the diameter of the outer surface of each bushing being different from the diameter of the outer surface of each remaining bushing, the internally screw-threaded bore in each spout nut being different from the internally screw-threaded bore in each remaining nut with respect to at least one characteristic selected from the group consisting of the diameter thereof, and the form of the screw-threading thereof, whereby a selected one of the bushings, the outer diameter of which is complementary to the diameter of an inner bore in a boss, is adapted to be disposed in the inner bore in the boss, with the base end portion of the spout swivellably mounted within the inner bore in said selected one of the bushings, and a selected one of the spout nuts, the diameter and form of the screw-threaded bore in which are complementary to the diameter and form of external screw-threading of the boss, is adapted to be screw-threadedly secured to said external screw-threading of the boss, with the base end portion of the spout, said selected one of the bushings, and said selected one of the spout nuts being restrained against substantial relative axial movement therebetween.

2. A combination according to claim 1, further comprising an outwardly projecting flange at one end of each of the bushings, an annular spout recess in the base end portion of the spout, an annular bushing recess in the bore of each bushing at said one end thereof, and a circlip, the flange of said selected one of the bushings being adapted to be clamped between the end wall of said selected one of the nuts and an end face of the boss, and the circlip being adapted to be disposed partially in said spout recess and partially in said bushing recess of said selected one of the bushings, thereby to provide said restraint against relative axial movement between the base end portion of the spout, said selected one of the bushings, and said selected one of the spout nuts.

3. In combination a plurality of replacement faucet spouts each having a water discharge end portion and a base end portion with the base end portions of the spouts being of substantially identical external diameter, a series of bushings each having an outer cylindrical surface and an inner cylindrical bore, and a series of spout nuts each having an end wall, an internally screw-threaded bore and an aperture in the end wall and through which the base end portion of each of the spouts may be disposed, the cylindrical bores in the bushings being of substantially identical diameter which is such that the base end portion of each of the spouts is swivellably mountable therein about an axis, the diameter of the outer surface of each bushing of the series thereof being different from the diameter of the outer surface of each remaining bushing of the series thereof, the internally screw-threaded bore in each spout nut of the series thereof being different from the internally screw-threaded bore in each remaining nut of the series thereof with respect to at least one characteristic selected from the group consisting of the diameter thereof, and the form of the screw-threading thereof, whereby a selected one of the series of bushings, the outer diameter of which is complementary to the diameter of an inner bore in a boss, is adapted to be disposed in the inner bore in the boss, with the base end portion of one of the spouts swivellably mounted within the inner bore in said selected one of the series of bushings, and a selected one of the series of spout nuts, the diameter and form of the screw-threaded bore in which are complementary to the diameter and form of external screw-threading of the boss, is adapted to be screw-threadedly secured to said external screw-threading of the boss, with the base end portion of said one of the spouts, said selected one of the series of bushings, and said selected one of the series of spout nuts being restrained against substantial relative axial movement therebetween.

4. A combination according to claim 3, further comprising one or more further series of the bushings with each bushing of each series thereof being identical to one of the bushings of each of the remaining series thereof, and one or more further series of the spout nuts with each spout nut of each series thereof being identical to one of the spout nuts of each of the remaining series thereof.

5. A combination according to claim 3, further comprising an outwardly projecting flange at one end of each of the bushings of the series thereof, an annular spout recess in the base end portion of each of the spouts, an annular bushing recess in the bore of each bushing of the series thereof and at said one end thereof, and one or more identical circlips, the flange of said selected one of the bushings of the series thereof being adapted to be clamped between the end wall of said selected one of the nuts of the series thereof and an end face of the boss, and one of the circlips being adapted to be disposed partially in the spout recess of said one of the spouts and partially in said bushing recess of said selected one of the bushings of the series thereof, thereby to provide said restraint against relative axial movement between the base end portion of said one of the spouts, said selected one of the bushings of the series thereof, and said selected one of the spout nuts of the series thereof.

* * * * *